United States Patent [19]
Buding et al.

[11] Patent Number: 4,675,248

[45] Date of Patent: Jun. 23, 1987

[54] POLYMER MIXTURES AND CO-VULCANIZATES PRODUCED THEREFROM

[75] Inventors: Hartmuth Buding, Dormagen; Heinrich Königshofen, Bergisch-Gladbach; Zsolt Szentivanyi; Joachim Thörmer, both of Leverkusen, all of Fed. Rep. of Germany

[73] Assignee: Bayer Aktiengesellschaft, Leverkusen-Bayerwerk, Fed. Rep. of Germany

[21] Appl. No.: 661,941

[22] Filed: Oct. 17, 1984

[30] Foreign Application Priority Data

Oct. 29, 1983 [DE] Fed. Rep. of Germany ....... 3339385

[51] Int. Cl.$^4$ .................. D02G 3/00; C08L 33/04; H01B 7/00
[52] U.S. Cl. .................. 428/398; 525/222; 174/110 AR
[58] Field of Search ............. 525/222; 174/110 AR; 428/398

[56] References Cited

U.S. PATENT DOCUMENTS

| | | | |
|---|---|---|---|
| 3,325,460 | 6/1967 | Schellenberg et al. | 526/212 |
| 4,243,576 | 1/1981 | Fischer et al. | 524/409 |
| 4,404,329 | 9/1983 | Maeda et al. | 525/349 |

FOREIGN PATENT DOCUMENTS 1069925 of 0000 Canada .
1558491 8/1976 United Kingdom .

*Primary Examiner*—Joseph L. Schofer
*Assistant Examiner*—N. Sarofim
*Attorney, Agent, or Firm*—Connolly & Hutz

[57] ABSTRACT

Co-vulcanizates which have good mechanical properties, a good resistance to oil, an effective flame resistance and a low smoke gas density are obtained from mixtures of (a) from 95 to 5% by weight of EVA rubber and (b) from 5 to 95% by weight of elastomers which contain nitrile groups and have from 25 to 140 nitrile groups and less than 35 double bonds per 1000 carbon atoms, by radical cross-linking.

5 Claims, No Drawings

POLYMER MIXTURES AND CO-VULCANIZATES PRODUCED THEREFROM

This invention relates to vulcanisable polymer mixtures of ethene-vinyl acetate copolymers (EVA) and substantially saturated elastomers containing nitrile groups, and to the co-vulcanisates produced therefrom by radical cross-linking.

EVA is a rubber which is resistant to weathering, chemicals, steam and hot water, and which exhibits a slight swelling in hydrocarbons. It is obtained by copolymerising ethylene, vinyl acetate and optionally acrylic acid esters, and it may be cross-linked radically using peroxides or by means of high-energy radiation.

EVA rubber is described in, for example German Offenlegungsschrift Nos. 1,495,767 and 2,437,490.

Substantially saturated elastomers containing nitrile groups are obtained, for example, by hydrogenating nitrile rubbers (butadiene-acrylonitrile copolymers). The vulcanisates are distinguished by a considerable strength.

Elastomers of this type are known, for example from U.S. Pat. No. 3,700,637 and from German Offenlegungsschrift Nos. 2,539,132 and 2,913,992.

Surprisingly, it has now been found that it is possible to produce homogeneous mixtures from EVA and substantially saturated elastomers containing nitrile groups, which mixtures have surprising properties and may be crosslinked radically to produce co-vulcanisates. It has been found that the densities of the mixtures are surprisingly higher than the average density caluated from the densities of the components.

Thus, the present invention provides mixtures of (a) from 95 to 5% by weight, preferably from 60 to 10% by weight of EVA rubber; and (b) from 5 95% by weight, preferably from 40 to 90% by weight, of elastomers which contain nitrile groups and have from 25 to 140 nitrile-nitrogen atoms per 1000 carbon atoms and less than 35 double bonds, preferably less than 12 double bonds, and in particular less than 2 double bonds per 1000 carbon atoms; and (c) conventional mixture ingredients, the percentages relating to the sum total of (a) and (b).

This invention also provides co-vulcanisates which are obtained by radical cross-linking of the above-mentioned mixtures.

EVA rubber preferably consists of 25 to 70% by weight of ethene, from 30 to 75% by weight of vinyl acetate and from 0 to 45% by weight of an acrylic acid ester, in particular an acrylic acid-$C_1$-$C_4$-alkyl ester, preferably from 70 to 50% by weight of ethene and from 30 to 50% by weight of vinyl acetate. The molecular weights $M_w$ are from 10,000 to 1,000,000.

The starting materials for the production of the substantially saturated elastomers containing nitrile groups are preferably nitrile rubbers of from 10 to 50% by weight of (meth)acrylonitrile, from 50 to 90% by weight of a conjugated diene having from 4 to 9 carbon atoms and from 0 to 30% by weight of a third monomer, for example (meth)acrylic acid, (meth)acrylic acid alkylester or vinyl ester which are hydrogenated, for example according to DE-OS No. 1,795,819.

The nitrile rubbers preferably consist of from 48 to 15% by weight of acrylonitrile and from 52 to 85% by weight of butadiene or isoprene.

Conventional ingredients of a rubber mixture are known to those skilled in the art. These are, for example fillers, plasticizers, anti-agers, processing auxiliaries, pigments, acid acceptors and vulcanisation chemicals, peroxides being used for the vulcanisation of the rubber mixture of this invention as long as vulcanisation is not effected by radiation cross-linking.

Suitable peroxides include the following, for example: dialkyl peroxides, ketal peroxides, aralkyl peroxides, peroxyethers and peroxyesters. The following are preferably used: di-tert.-butylperoxide, bis-(tert.-butylperoxyisopropyl-benzene), dicumylperoxide, 2,5-dimethyl-2,5-di(tert.-butylperoxy)-hexane, 2,5-dimethyl-2,5-di(tert.-butylperoxy)-hexene-(3), 1,1-bis(tert.-butylperoxy)3,3,5-trimethylcyclohexane, benzoylperoxide, tert.-butylcumylperoxide and tert.-butylperbenzoate.

The quantities of peroxide are from 1 to 15% by weight, preferably from 2 to 6% by weight, based on the solid rubber.

High-energy electromagnetic radiation is included in particular as the high-energy radiation for cross-linking; for example X-rays or $\gamma$-rays and electron beams.

The co-vulcanisates exhibit good mechanical properties, a good oil resistance, an effective flame resistance and a low smoke density when ignited. They are suitable, for example for the production of cable sheaths and conveyor belt covers, in particular in areas of use which impose specific requirements, such as a resistance to swelling in oil and/or water.

EXAMPLE

The following mixtures are produced in a 1,3 liter laboratory kneader at 30° C., with a degree of filling of 100%, at 30 r.p.m. and under a stamping pressure of 6 bars.

| | Parts by weight | | | | |
|---|---|---|---|---|---|
| | A | B | C | D | E |
| HNBR* | 100 | 90 | 50 | 10 | 0 |
| EVA** | 0 | 10 | 50 | 90 | 100 |
| Polycarbodiimide (50% by weight) | 0 | 0.3 | 1.5 | 2.7 | 3 |
| Magnesium oxide | 2 | 2 | 2 | 2 | 2 |
| Aluminium oxyhydrate (BET surface 12 m²/g) | 80 | 80 | 80 | 80 | 80 |
| Vinylsilane | 2 | 2 | 2 | 2 | 2 |
| Aluminium oxyhydrate (BET surface 6 m²/g) | 80 | 80 | 80 | 80 | 80 |
| Tripropylene glycol | 2 | 2 | 2 | 2 | 2 |
| Zinc borate | 10 | 10 | 10 | 10 | 10 |
| Magnesium carbonate | 20 | 20 | 20 | 20 | 20 |
| Styrolised diphenylamine | 1 | 1 | 1 | 1 | 1 |
| Trialkylcyanurate (80% by weight) | 3 | 2.8 | 2 | 1.2 | 1.0 |
| Bis-(tert.-butylperoxyisopropylbenzene) (40% by weight) | 10 | 9.6 | 8 | 6.4 | 6.0 |
| Density [g/cm³] | 1.545–1.551 | 1.562–1.566 | 1.574–1.577 | 1.586–1.589 | 1.591–1.594 |

*Hydrogenated acrylonitrile butadiene copolymer having a content of acrylonitrile of 34% by weight, a degree of hydrogenation of >99% and a Mooney viscosity ML at 100° C. (1 + 4) of 70 ME.

**Ethene-vinyl acetate copolymer of 50% by weight of ethane and 50% by weight of vinyl acetate having a Mooney viscosity ML at 100° C. (1 + 4) of 20 ME.

The mixture is vulcanised at 190° C. for 5 minutes. The following values were found:

| | A | B | C | D | E |
|---|---|---|---|---|---|
| F [MPa] | 18.0 | 19.0 | 17.0 | 14.5 | 13.0 |

-continued

|  | A | B | C | D | E |
|---|---|---|---|---|---|
| D [%] | 125 | 145 | 100 | 100 | 115 |
| $M_{100}$ [MPa] | 15.5 | 14.4 | 17.0 | 14.5 | 12.5 |
| $H_{20}$ [Shore A] | 87 | 86 | 87 | 84 | 84 |
| Tear propagation resistance according to DIN 53 507 VDE | 2.7 | 4.0 | 5.8 | 3.3 | 3.3 |
| Oxygen index ASTM D 2863 | 33.5 | 33.5 | 37.7 | 38.0 | 40.0 |
| Smoke gas density without pilot flame | 234 | 231 | 251 | 250 | 286 |
| Swelling in water 7 d/70° C.; Δ G [%] | 2.1 | 3.2 | 4.5 | 7.5 | 9.4 |
| Swelling in ASTM oil III 24 h/100° C.; Δ G [%] | 4.8 | 6.4 | 14.0 | 25.8 | 30.6 |

We claim:

1. A mixture of (a) from 60 to 10% by weight of ethylene vinylacetate copolymer, (b) from 40 to 90% by weight of an elastomer which contains nitrile groups and has from 25 to 140 nitrile-nitrogen atoms and less than 35 double bonds per 1000 carbon atoms, (c) from 1 to 15% by weight of a peroxide the percentages relating to the total of (a) and (b).

2. A mixture according to claim 1, in which (b) contains less than 12 double bonds per 1000 carbon atoms.

3. A mixture according to claim 1, in which (b) contains less than 2 double bonds per 1000 carbon atoms.

4. A co-vulcanisate produced by radically cross-linking the mixture according to claim 1.

5. A cable sheath produced by radically cross-linking the mixture according to claim 1.

* * * * *

UNITED STATES PATENT AND TRADEMARK OFFICE
CERTIFICATE OF CORRECTION

PATENT NO. : 4,675,248
DATED : June 23, 1987
INVENTOR(S) : Buding et al

It is certified that error appears in the above-identified patent and that said Letters Patent is hereby corrected as shown below:

Column 1, line 36 "from 5 95%" should read --from 5 to 95%--.

Column 2, line 53 "Trialkylcyanurate" should read --Triallylcyanurate--.

Column 2, line 61 "ethane" should read --ethene--.

Signed and Sealed this

Twenty-ninth Day of March, 1988

Attest:

DONALD J. QUIGG

*Attesting Officer*   *Commissioner of Patents and Trademarks*